United States Patent
Ravimohan et al.

(10) Patent No.: US 11,789,616 B2
(45) Date of Patent: Oct. 17, 2023

(54) STORAGE SYSTEM AND METHOD FOR DYNAMIC ALLOCATION OF SECONDARY BACKUP BLOCKS

(71) Applicant: Western Digital Technologies, Inc., San Jose, CA (US)

(72) Inventors: Narendhiran Chinnaanangur Ravimohan, Bangalore (IN); Balakumar Rajendran, Tamil Nadu (IN)

(73) Assignee: Western Digital Technologies, Inc., San Jose, CA (US)

(*) Notice: Subject to any disclaimer, the term of this patent is extended or adjusted under 35 U.S.C. 154(b) by 141 days.

(21) Appl. No.: 17/183,678

(22) Filed: Feb. 24, 2021

(65) Prior Publication Data
US 2022/0171539 A1    Jun. 2, 2022

Related U.S. Application Data

(60) Provisional application No. 63/119,778, filed on Dec. 1, 2020.

(51) Int. Cl.
*G06F 3/06* (2006.01)

(52) U.S. Cl.
CPC .......... *G06F 3/0614* (2013.01); *G06F 3/0631* (2013.01); *G06F 3/0653* (2013.01); *G06F 3/0673* (2013.01)

(58) Field of Classification Search
CPC .... G06F 3/0614; G06F 3/0631; G06F 3/0653; G06F 3/0673
See application file for complete search history.

(56) References Cited

U.S. PATENT DOCUMENTS

| | | | |
|---|---|---|---|
| 8,176,015 B1* | 5/2012 | Somerville | G06F 11/1451 707/661 |
| 11,249,652 B1* | 2/2022 | Kuzmin | G06F 3/0685 |
| 2009/0172464 A1* | 7/2009 | Byrne | G06F 11/1092 714/E11.023 |
| 2014/0258658 A1* | 9/2014 | Best | G06F 3/0689 711/162 |
| 2016/0188404 A1* | 6/2016 | Das | G06F 11/1048 714/773 |
| 2016/0224267 A1* | 8/2016 | Yang | G06F 3/0679 |
| 2017/0269852 A1* | 9/2017 | Lin | G11C 16/3427 |
| 2018/0165021 A1* | 6/2018 | Tomic | G06F 3/064 |
| 2019/0332530 A1* | 10/2019 | Ji | G11C 16/10 |
| 2021/0182141 A1* | 6/2021 | Balb | G06F 11/3055 |

* cited by examiner

*Primary Examiner* — Kaushikkumar M Patel
(74) *Attorney, Agent, or Firm* — Crowell & Moring LLP

(57) ABSTRACT

A storage system receives data to be stored in its memory. A controller in the storage system allocates a primary block of the memory to store the data and determines the health of the allocated block. If the controller determines that the allocated block is not healthy enough to reliably store the data, the controller allocates a secondary block to redundantly store the data.

13 Claims, 6 Drawing Sheets

STORAGE SYSTEM AND METHOD FOR DYNAMIC ALLOCATION OF SECONDARY BACKUP BLOCKS

CROSS-REFERENCE TO RELATED APPLICATION

This application claims the benefit of U.S. provisional patent application No. 63/119,778, filed Dec. 1, 2020, which is hereby incorporated by reference.

BACKGROUND

During the production of a storage system, it may be known that the memory used in the storage system is not able to reliably store data. In this case, the controller of the storage system can be configured to always perform a dual-write programming operation, in which data received by a host is stored in primary and secondary blocks of memory. That way, if there is a problem with reading the data from the primary block, the controller can read the data from the secondary block. In contrast, if it is known during production that the memory is able to reliably store data, the controller does not automatically perform the dual-write programming operation.

DETAILED DESCRIPTION

Figure 1A:
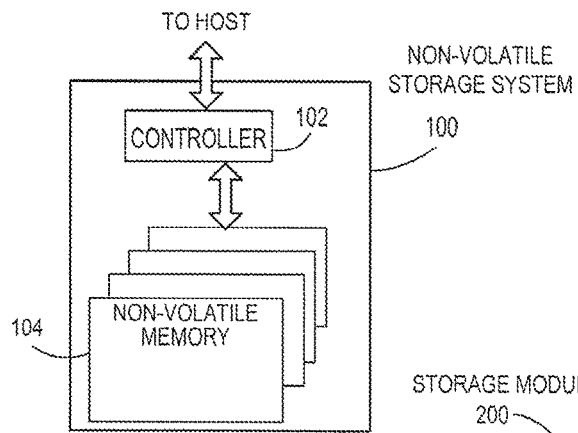
FIG. 1A is a block diagram of a non-volatile storage system of an embodiment.
Figure 1B:
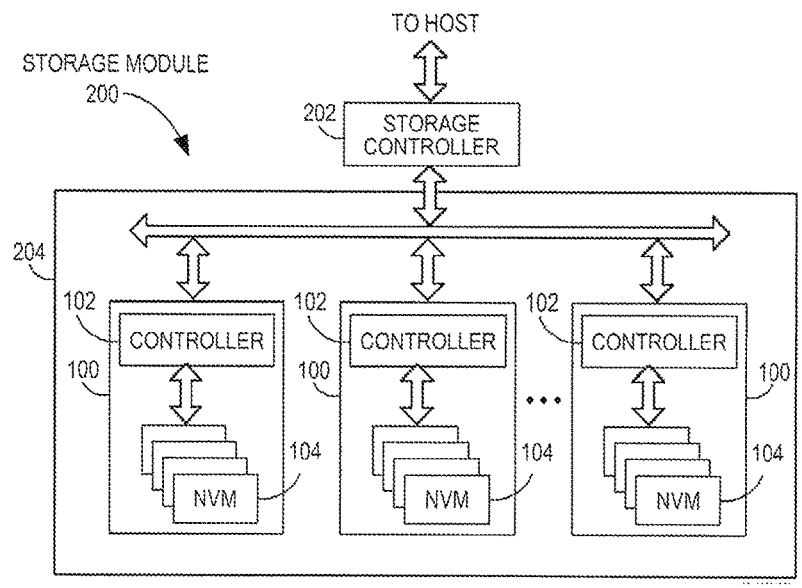
FIG. 1B is a block diagram illustrating a storage module of an embodiment.
Figure 1C:
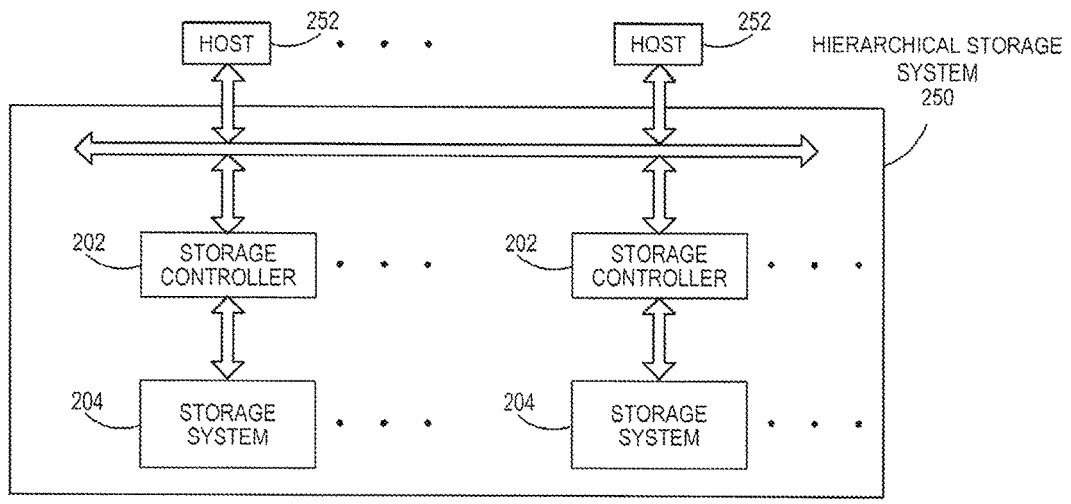
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
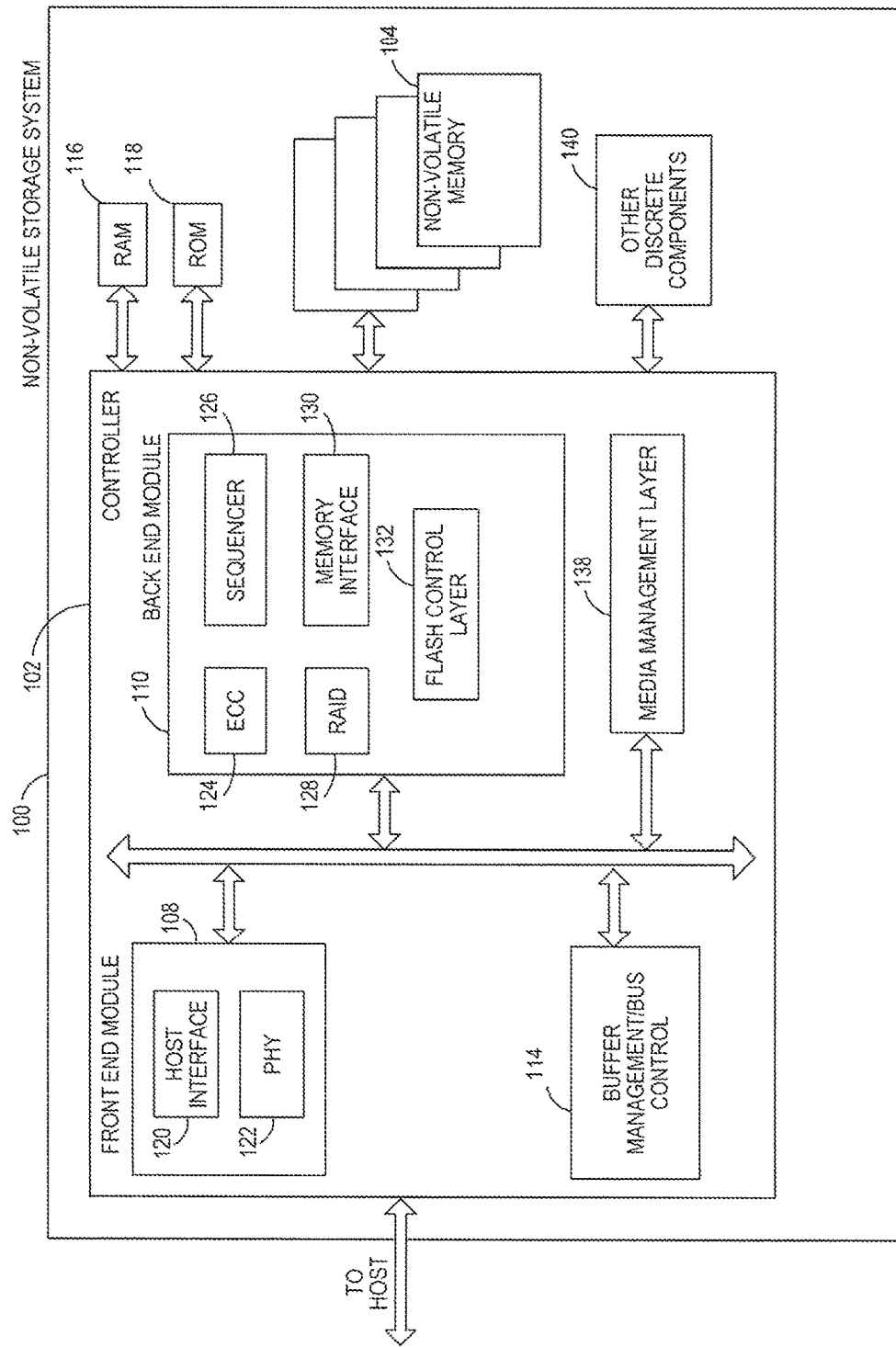
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
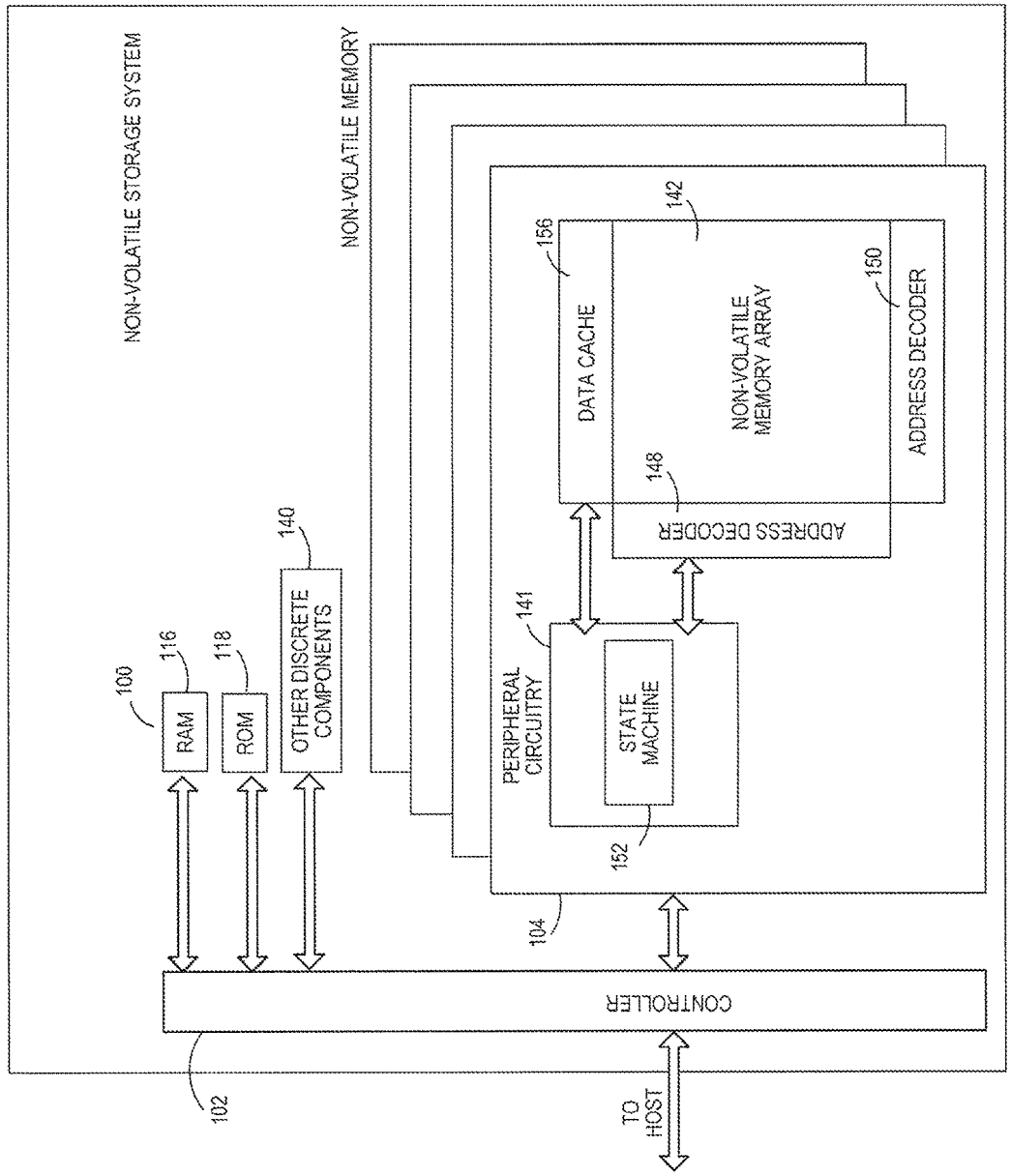
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
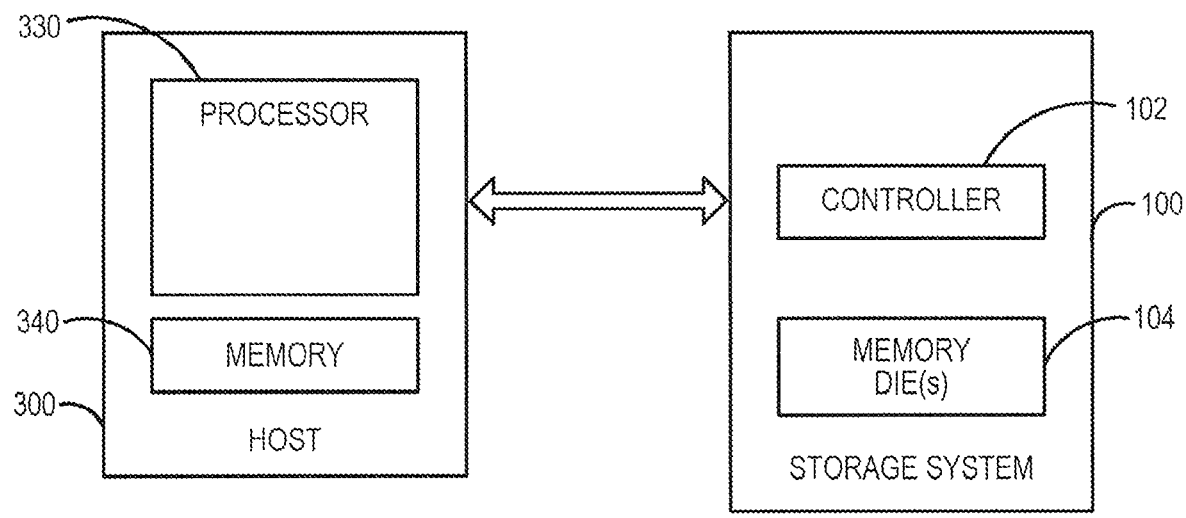
FIG. 3 is a diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340) to the storage system 100 for storage in the storage system's memory 104.

In general, the quality of a memory die can vary. Memory dies of lesser quality ("non-prime dies") can still be used in a storage system, but precautions may be needed to ensure data reliability. For example, some storage systems use an exclusive-or (XOR) method to ensure data reliability. However, such methods are typically memory intensive and cannot cater to the needs of all front-end protocols. They are also costly in terms of computational overhead and RAM footprint. As such, low-cost removable storage systems typically cannot benefit from this method to ensure data reliability.

Another method that can be used to ensure data reliability is to allocate secondary backup blocks and use a dual-write programming method to write data (e.g., received from the host) in both a primary memory block and (in parallel or in series) a secondary backup memory block. That way, if there is a defect in a wordline of the primary memory block storing the data, the data can still be read from the secondary backup memory block. A post-write data check (such as an enhanced post-write read (EPWR)) can be performed on the data written in the primary block before the secondary copy is discarded.

This method can come at the cost of host bandwidth, which is limited by the available RAM in the storage system. This restricts the storage system's efficiency to a combined factor of RAM and NAND throughput in terms of the serviceable write performance. At higher host bandwidths, the storage system can become the bottleneck. One other sizeable impact is the allocation of a constant secondary block pool (typically single-level cells (SLC)), which can reduce the bytes/endurance of the storage system). Consuming a great deal of secondary backup blocks can pose a restriction on the block budget of the storage system, which can limit the storage system's write performance, capacity, overprovisioning capabilities, and/or supported endurance.

The following embodiments recognize that not all primary blocks in the storage system are vulnerable to failure. More specifically, in storage systems that are configured to perform a dual-program write for every write operation, secondary blocks are used even though they may not be needed for data protection. As a result, these unneeded secondary blocks can cause a large redundancy to the storage system from the perspective of available blocks versus blocks actually vulnerable to failure.

In these embodiments, instead of performing a dual-program write for every write operation, the controller 102 of the storage system 100 makes the determination of whether or not to use a secondary block on a block-by-block basis based on the health of a given primary block. The controller 102 can perform this selective allocation of a secondary block in any suitable way. For example, the controller 102 in the storage system 100 can compute the failure probability of the current active block that is picked for programming and, based on the probability that the block is not needed, the controller 102 release a secondary block that would otherwise have been used to protect the data integrity.

In general, with these embodiments, a secondary block can be allocated only when required, e.g., based on memory health. Memory health data can indicate the probability of a block failure at different operating conditions. If this failure information are tied to a specific phenomenon of the memory 102, which can be understood by the controller 102 (e.g., firmware), then the blocks vulnerable to such failure can be identified by the controller 102 at the right time, so that the controller 102 only uses secondary backup blocks for vulnerable primary memory blocks.

Memory health can be indicted by any suitable factor(s). The following paragraphs provide some example factors. It should be understood that there are only examples and that other or different factors can be used.

One factor is erase status. After erasing a block, the amount of erase loops taken or number of zeros after erase success can be mapped towards the health of the block. The block location is another factor. If blocks in specific zones and locations are vulnerable, then the same information can be used for protecting those blocks.

Program status is another example. Similar to erase status, the amount of program-verify loops taken can indicate the health of the block. The program/verify current can be another attribute that the controller 102 can look for to understand the physical state of block.

An enhanced post-write read (EPWR) operation can be used so that vulnerable wordlines from the memory health data can be preemptively checked for a bit error rate (BER) above a threshold and backed up. Cycling is another factor, as blocks tend to become vulnerable after certain aging.

Existing memory health information can provide failure probability information. If these failures can be attributed towards the physical attributes of the memory 104 and if the same information is available to the controller 102, the controller 102 can take informed decisions to know when to use a secondary block for backup.

Figure 4:
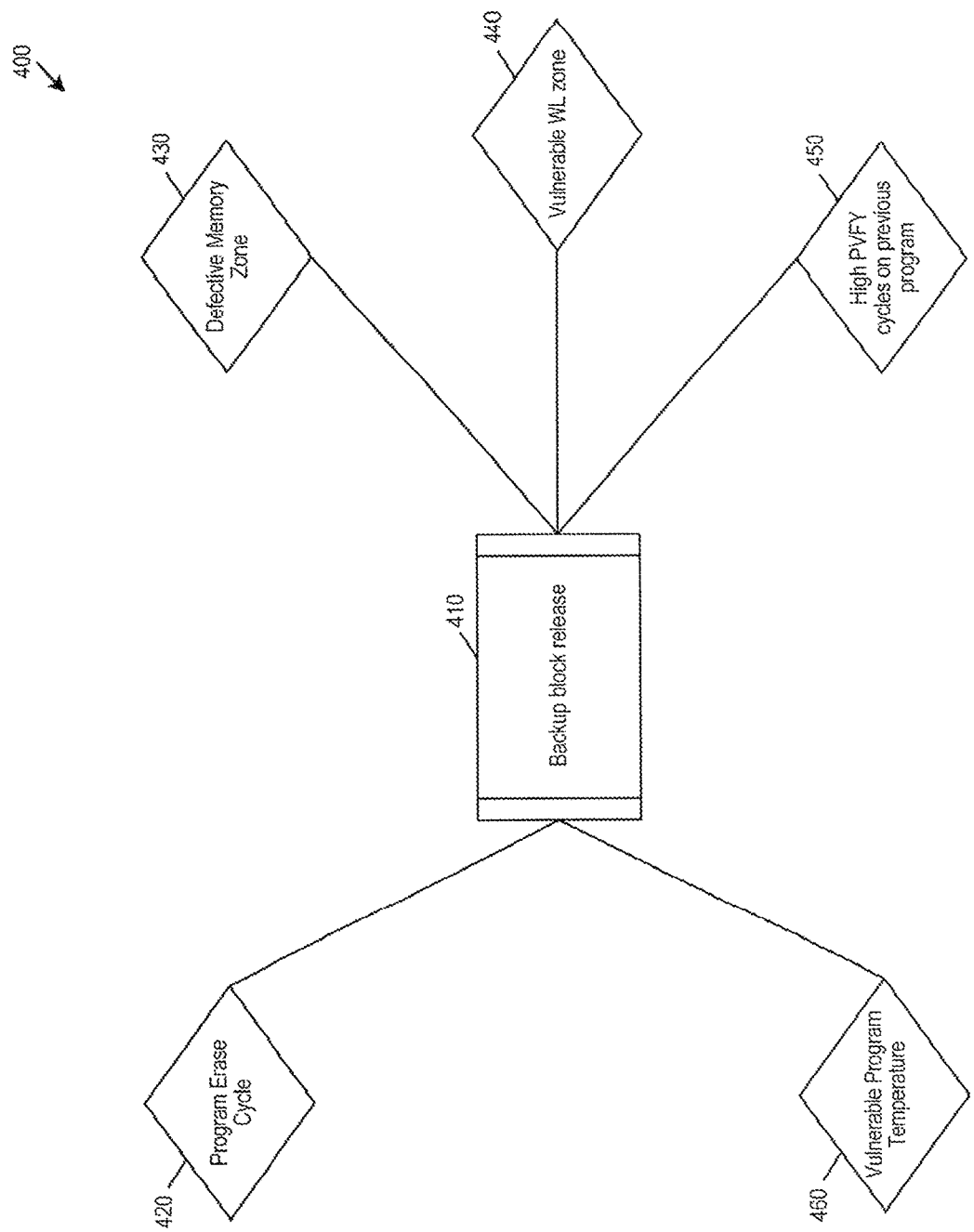
FIG. 4 is a diagram showing various probability estimations that can be used in a method of an embodiment for determining whether to release a backup block.

The controller 102 can use any suitable probability estimation. FIG. 4 presents a diagram 400 of various estimations that can be used in the controller's determination of a backup block release (410). Program Erase (PE) cycle count (420) is one such probability estimation. PE cycle count of a specific block can define its behavioral characteristics. Assuming a high-endurance product having a memory characterization that signifies all dies show a program failure (PF) occurrence on random wordlines at 75% of the target endurance, the probability to release a secondary block after 75% cycles becomes $P(PE_{Cycle})$ Another probability estimation is related to a defective memory zone (430). If the memory characterization shows that blocks in a specific memory zone (out of n zones) show random failures, then the probability of releasing secondary blocks from a different zone if the active block is picked from the vulnerable zone becomes $P(Def_{Zone})$. Vulnerable program temperature (460) is another estimation that is similar to memory zone vulnerability, but when the specific program temperature is detected, a secondary block is released: $P(\text{Def}_{prgTEMP})$ Another possible estimation is a vulnerable wordline zone (440). If the memory characterization shows that a specific group of wordlines are prone to failure (e.g., edge wordlines), then a secondary block can be released only if the active writes are routed to these wordline zones: $P(\text{Def}_{WLZone})$ Finally, a high post-verify (PVFY) cycle estimation (450) can be used. In an ideal condition, if an active program completion has taken more cycles than a specific (typical) threshold, than a secondary block can be released for the active block based on this condition: $P(\text{Def}_{tPROG})$ Based on the above probability estimations, a consolidated decision could be derived as:

$$P(\text{releaseSecondary})=P(\text{PECycle})*P(\text{DefZone})* \\ P(\text{DefprgTEMP})*P(\text{DefWLZone})* \\ P(\text{DeftPROG})$$

If the controller 102 determines that this probability P(releaseSecondary) is higher than a threshold, the controller 102 can release/avoid using a secondary block.

Figure 5:
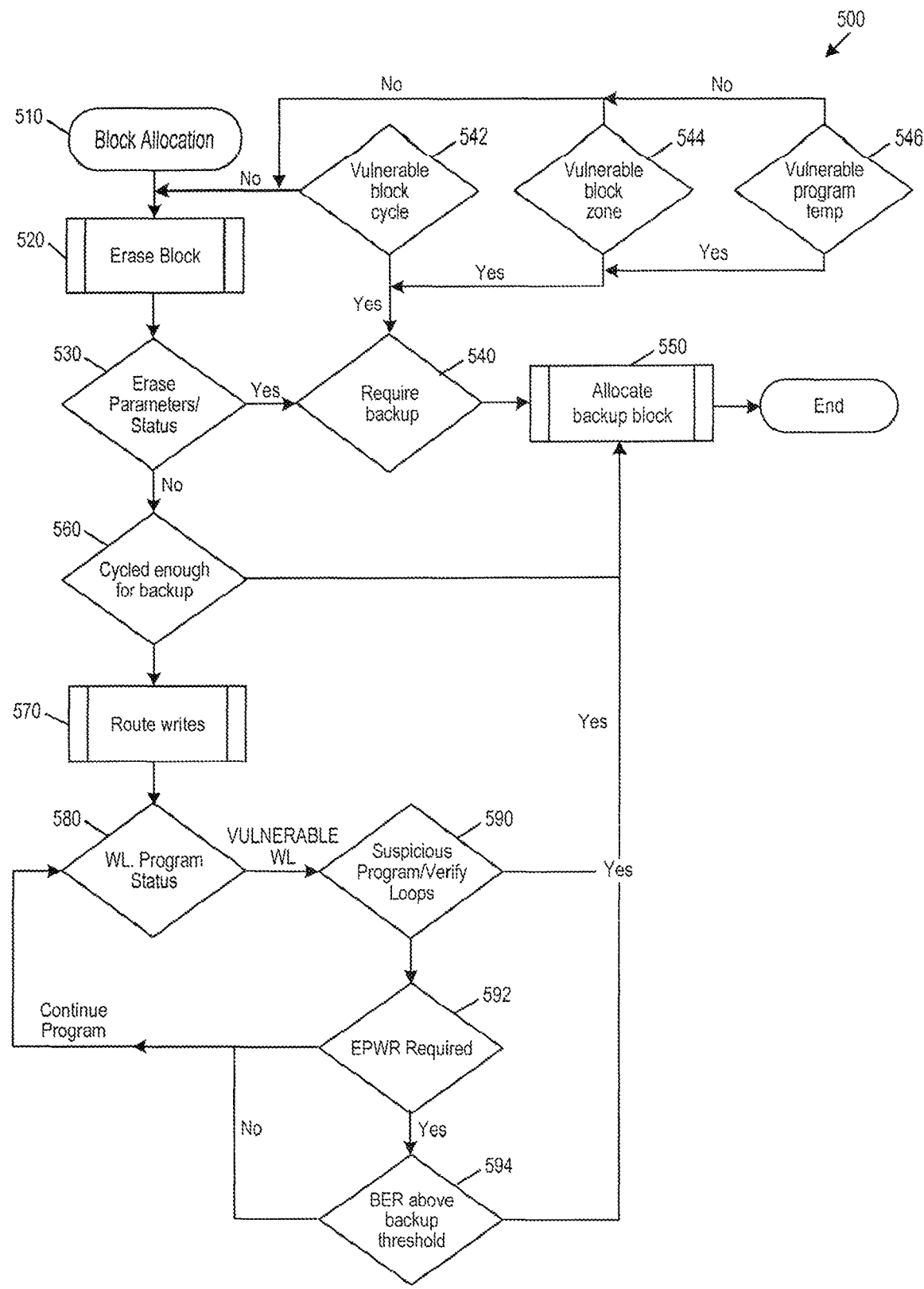
FIG. 5 is a flow chart of a method of an embodiment for dynamic allocation of secondary backup blocks.

Turning again to the drawings, FIG. 5 is a flow chart 500 of a method of an embodiment for dynamic allocation of secondary backup blocks. As shown in FIG. 5, when the controller 102 allocates a primary block for a write operation (act 510), the controller 102 first erases the block (act 520) and determines the erase parameters/status (act 530). In this example, it is assumed that the erase operation was successful, and the erase parameters/status is an indication of whether it took too much time to perform the erase. That is, if the block took longer than a threshold amount of time to be erased, that can indicate that the block is not healthy, in which case a backup block may be needed, so that the data can be redundantly stored. As shown in the flow chart 500, if the erase operation took too long, the controller 102 concludes that a backup is required (act 540) and allocates the backup block for redundant data storage (act 550). As also indicated in the flow chart 500, if offline data indicates the probability of a vulnerable block cycle (act 542), a vulnerable block zone (act 544), or a vulnerable program temperature that is above a threshold amount (act 546), the controller 102 also allocates a backup block (act 550).

If the primary block did not take too long to erase, the controller 102 then determines if the primary block may have been cycled too many times (act 560). If the program-erase cycle count is above a threshold, the controller 102 allocates a backup block (act 550). If the program-erase cycle count is not above the threshold, the controller 102 writes data to the primary block and determines its program status (act 580). For example, the controller 102 may know that certain wordlines (e.g., WL 0-7) are vulnerable. If the programming occurred in these vulnerable wordlines, the controller 102 can determine if the programming operation took longer than a threshold amount of time (act 590). If it did, the controller 102 allocates a backup block (act 550). If it did not, the controller 102 determines if an enhanced post-write read (EPWR) operation is needed (act 592). If it is and if the bit error rate (BER) is above a threshold (act 594), the controller 102 allocates a backup block (act 550).

There are several advantages associated with these embodiments. With these embodiments, the controller 102 of the storage system 100 can selectively use a secondary backup block based on probability estimations of the memory's health instead of always using a secondary backup block or never using a secondary backup block. This provides several benefits. For example, these embodiments can provide a relaxed block budget at time zero, with only the minimum required number of blocks being allocated to the block pool. The additional blocks that would have otherwise been used as secondary backup blocks can be used for other purposes, such as, for example, to improve burst performance and increase MLC pool size, which can support higher endurance. Further, these embodiments provide a cost-effective solution that is not as computationally intensive as the XOR method discussed above, nor do they use as much RAM. Additionally, these embodiments can improve write performance because, for most of the runtime, only a single-copy write operation is performed. This shifts the bottleneck to RAM availability or to the host 300 and provides near-efficient usage of raw memory throughput. Further, these embodiments can improve yield because the storage system 100 can afford to consume a larger number of dies with different health levels as the block budget is relaxed.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to:
    allocate a primary block and a secondary block of the memory to store data using a dual-write programming method;
    in response to allocating the primary and secondary blocks, compute a probability that the secondary block can be released;
    determine whether the probability that the secondary block can be released is above a threshold;
    in response to determining that the probability that the secondary block can be released is not above the threshold, perform the dual-write programming method to redundantly store the data in the primary block of the memory and the redundant block of the memory; and
    in response to determining that the probability that the secondary block can be released is above the threshold:
        store the data in the primary block of the memory but not in the secondary blocks of the memory; and
        release the secondary block of the memory for a purpose other than to redundantly store the data;
    wherein the probability that the secondary block can be released is based on whether a certain number of program-erase cycles have been performed in the primary block, whether the primary block is part of a defective memory zone, and whether the primary block is at a certain program temperature.

2. The storage system of claim 1, wherein the probability is computed at least in part by an amount of time needed to erase the primary block of the memory.

3. The storage system of claim 1, wherein the probability is computed at least in part by the primary block's location in the memory.

4. The storage system of claim 1, wherein the probability is computed at least in part by a status of a program operation to the primary block of the memory.

5. The storage system of claim 1, wherein the probability is computed at least in part by a status of a post-write verification operation on the primary block of the memory.

6. The storage system of claim 1, wherein the primary and secondary blocks of the memory comprise single-level cells.

7. The storage system of claim 1, wherein the memory comprises a three-dimensional memory.

8. The storage system of claim 1, wherein the purpose improves burst performance.

9. The storage system of claim 1, wherein the purpose increases a multi-level cell (MLC) pool size.

10. In a storage system comprising a memory, a method comprising:
    allocating a primary block and a secondary block of the memory to store data using a dual-write programming method;
    in response to allocating the primary and secondary blocks, computing a probability that the secondary block can be released;
    determining whether the probability that the secondary block can be released is not above a threshold;
    in response to determining that the probability that the secondary block can be released is not above the threshold, performing the dual-write programming method to redundantly store the data in the primary block of the memory and the redundant block of the memory; and
    in response to determining that the probability that the secondary block can be released is above the threshold:
    storing the data in the primary block of the memory but not in the secondary blocks of the memory; and
    releasing the secondary block of the memory for a purpose other than to redundantly store the data;
    wherein the probability that the secondary block can be released is based on whether a certain number of program-erase cycles have been performed in the primary block, whether the primary block is part of a defective memory zone, and whether certain wordlines in the primary block are to be programmed.

11. The method of claim 10, wherein the probability is computed based on a health of the primary block.

12. The method of claim 10, wherein the purpose improves burst performance and/or increases a multi-level cell (MLC) pool size.

13. A storage system comprising:
    a memory;
    means for allocating a primary block and a secondary block of the memory to store data using a dual-write programming method;
    means for, in response to allocating the primary and secondary blocks, computing a probability that the secondary block can be released
    means for determining whether the probability that the secondary block can be released is above a threshold;
    means for, in response to determining that the probability that the secondary block can be released is not above the threshold, performing the dual-write programming method to redundantly store the data in the primary block of the memory and the redundant block of the memory; and
    means for, in response to determining that the probability that the secondary block can be released is above the threshold:
    storing the data in the primary block of the memory but not in the secondary blocks of the memory; and
    releasing the secondary block of the memory for a purpose other than to redundantly store the data;
    wherein the probability that the secondary block can be released is based on whether a certain number of program-erase cycles have been performed in the primary block, whether the primary block is part of a defective memory zone, and whether a post-verify cycle estimation for the primary block is above a threshold.

* * * * *